UNITED STATES PATENT OFFICE.

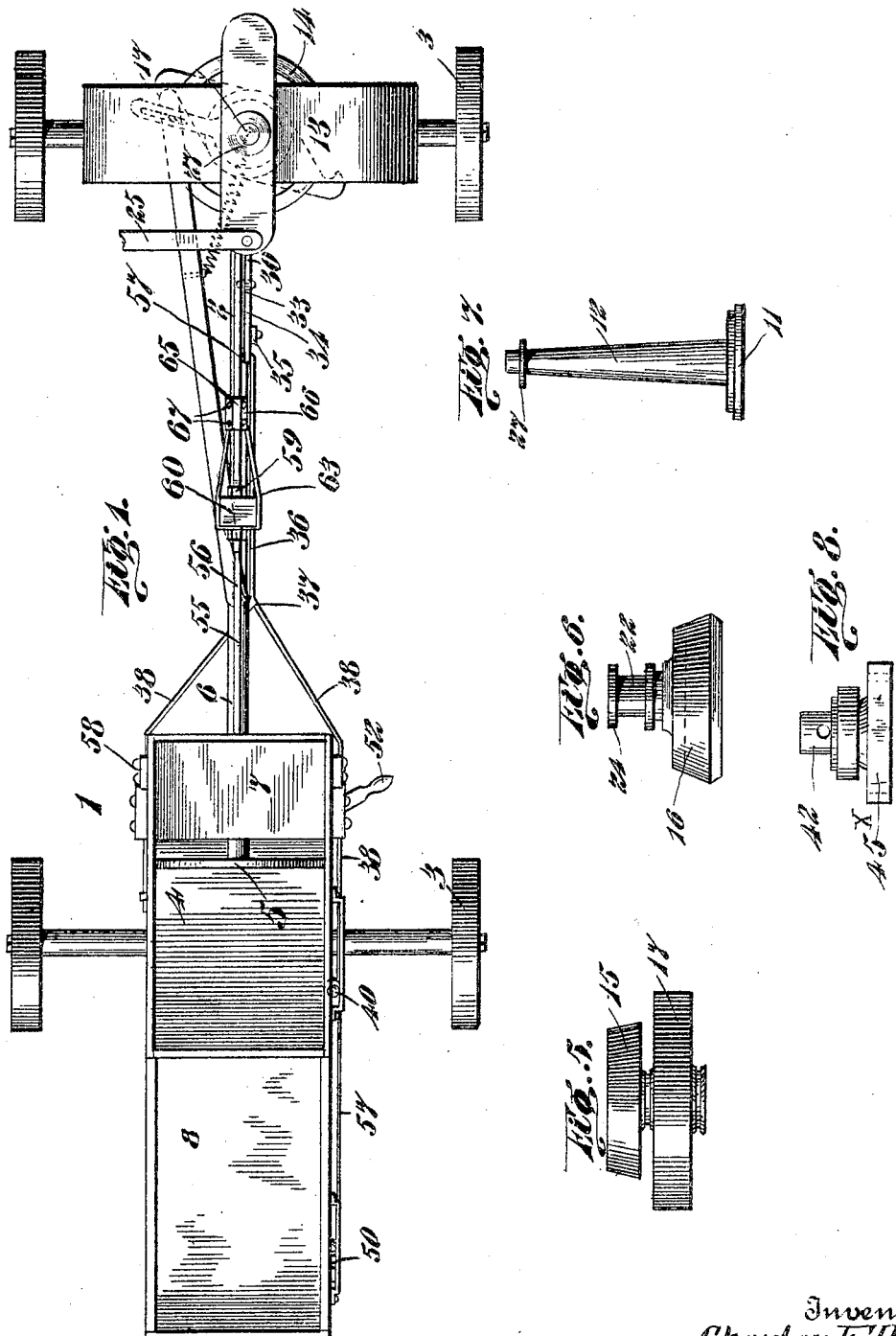

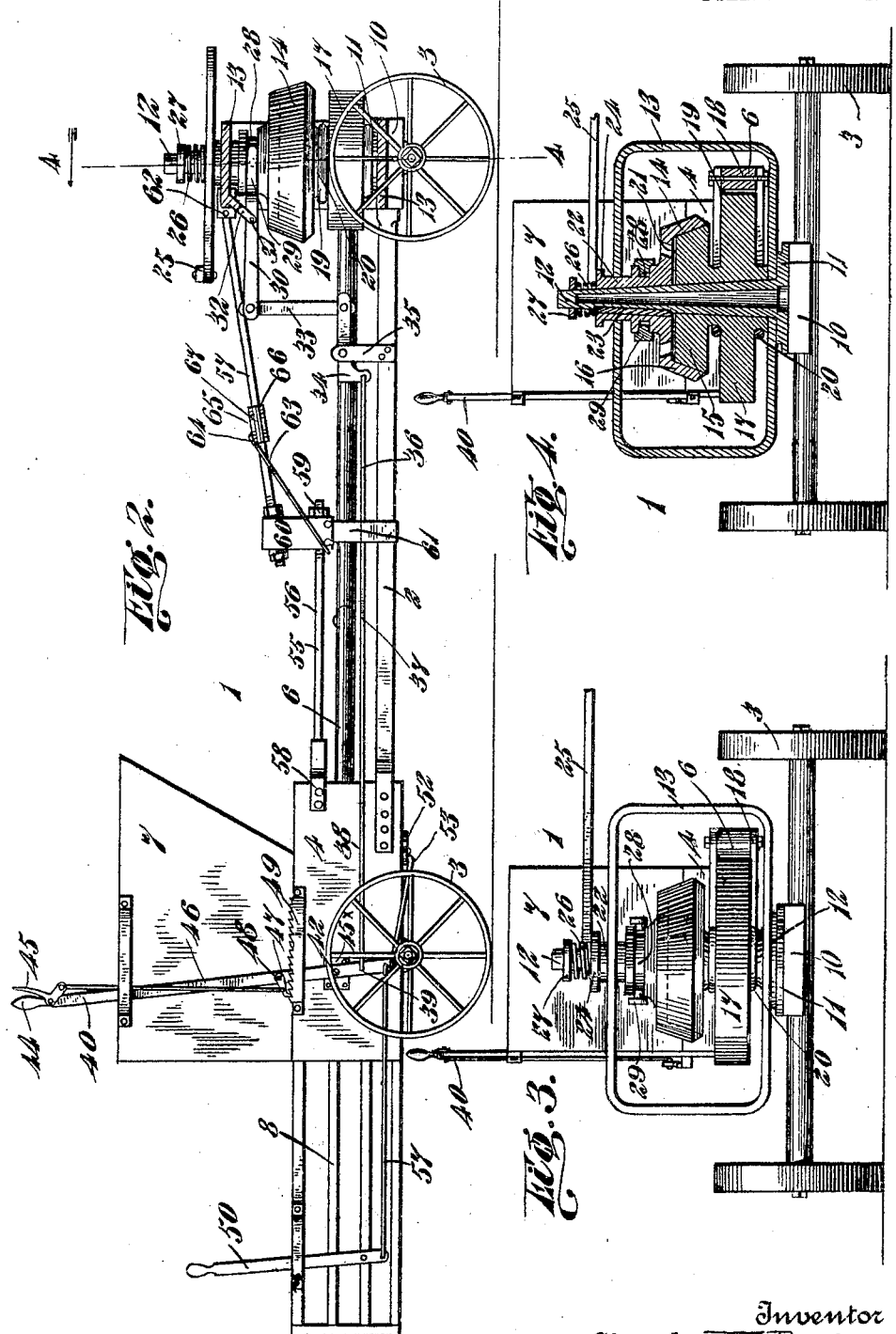

CHARLEY E. DAVIS, OF AURORA, MISSOURI.

HAY-PRESS.

No. 798,571. Specification of Letters Patent. Patented Aug. 29, 1905.

Application filed October 20, 1904. Serial No. 229,288.

*To all whom it may concern:*

Be it known that I, CHARLEY E. DAVIS, a citizen of the United States, residing at Aurora, in the county of Lawrence and State of Missouri, have invented certain new and useful Improvements in Hay-Presses; and I do declare the following to be a full, clear, and exact description of the invention, such as will enable others skilled in the art to which it appertains to make and use the same.

My invention relates to improvements in presses, more particularly hay-presses.

One object of my invention is to provide a simple and efficient means for instantly throwing the press into and out of operation without stopping the power or driving element.

Another object of my invention is to provide a simple, strong, and durable brace for a hay-press of this character.

The above and other objects, which will appear as the nature of my invention is better understood, are accomplished by the construction illustrated in the accompanying drawings, in which—

Figure 1 is a top plan view of a hay-press with my improvements applied thereto. Fig. 2 is a side elevation of the same. Fig. 3 is an end elevation. Fig. 4 is a vertical transverse sectional view taken on the line 4 4 in Fig. 2. Figs. 5 and 6 are detail views of the two clutch members and their attached parts. Fig. 7 is a detail view of the spindle for the clutch mechanism, and Fig. 8 is a detail view of the pivot-block for the operating-lever.

Referring to the drawings by numerals, 1 denotes a hay-press of any well-known or preferred construction, but preferably comprising a frame 2, suitably mounted upon front and rear supporting-wheels 3 and having adjacent to one end above the rear wheels a press-box 4. Mounted to reciprocate within said box 4 is a plunger 5, which is secured upon one end of a plunger-rod 6. The hay or other material to be compressed is fed into the box or chamber 4 between the plunger 5 and a suitable head in one end of said box through a hopper 7, mounted above said box, as shown. The hay after being compressed in the box 4 is moved into a slotted projecting portion 8 of the latter, in which the bale is wired.

Mounted upon the frame 2 above the front wheels 3 or at any other suitable point is a bearing 10, in which is rotatably mounted the head 11 upon the lower end of a vertically-disposed spindle or shaft 12, which is preferably slightly tapered from its lower to its upper end. Upon said bearing 10 and head 11 is mounted an open frame 13 of substantially rectangular form, through an opening in the upper portion of which projects the upper end of the spindle 12. Within the frame 13 upon said spindle is mounted a power-clutch 14, preferably of the friction type, and consisting of two coacting members 15 and 16, the former being in the form of a frusto-conical head and the latter in the form of a cup-like body having a frusto-conical recess or cavity adapted to engage said head, as clearly shown in Fig. 4 of the drawings. Said member 15 is formed integral with a cam 17, which is adapted to operate or reciprocate the press plunger-rod 6, the outer end of the latter being pivotally connected, as shown at 18, upon the outer ends of links 19, which have their inner ends pivotally mounted, as shown at 20, above and below said cam 17. It will be seen that as said cam is rotated upon the spindle 12 it will alternately engage and release the outer end of the plunger-rod 6, thus reciprocating the latter and the piston 5 within the press box or chamber 4. The clutch member 16, which is provided with a series of vents 21 to permit it to be readily disengaged from the other member 15, has upon its upper portion an integral sleeve 22, which extends through said opening in the top of the frame 13. This sleeve is free to slide upon the spindle 12, but is keyed to rotate therewith, as shown at 23 in Fig. 4 of the drawings. Upon the upper end of said sleeve 22 above the frame 13 is formed an integral sweep-head 24, to which the usual sweep-beam 25 is secured. Instead of operating the press by a team of draft-animals attached to the sweep-beam 25 a band-pulley or any other suitable form of power driving element may be substituted for the sweep-head 24 for the purpose of imparting a rotary movement to the clutch member 16 and the spindle 12. The clutch member 16 is held normally in engagement with the member 15 by means of a coil-spring 26, which surrounds the upper end of the spindle 12 and is confined between the sweep-head 24 and a cross-pin or key 27, passed through an opening in the upper end of the spindle. It will be seen that when the clutch member 16 on said spindle is rotated its movement will be imparted to the member 15 and cam 17, which latter will operate the plunger-rod 6, as will be readily understood upon reference to Figs. 1 and 2 of the drawings.

In order to permit the press to be stopped at any desired point, I provide means for disengaging the clutch member 16 from the member 15. The same consists in forming said sleeve 22 with an annular groove 28, which is engaged by the forked end 29 of a lever 30, pivoted at 31 in an arm 32, depending from the upper portion of the frame 13. The outer end of said lever 30 is pivotally connected by a link 33 to one end of a bell-crank 34, which is pivotally mounted in a bracket 35, secured upon the frame 2. The opposite end or arm of said bell-crank is pivotally connected to a connecting link or rod 36, which is bifurcated or forked, as shown at 37, to provide two arms 38. One of the arms 38 is pivotally connected, as at 39, to the lower portion of an operating-lever 40. Said lever is pivoted adjacent to its lower end upon a stud 42, formed upon a block 45×, which is secured upon one side of the box 4. The upper portion of said lever 40, which projects above the hopper 7 within convenient reach of the person who feeds the hay into the latter, is formed with a handle 44, to which is pivoted a bell-crank 45, connected by a link 46 to a pawl or dog 47. Said pawl or dog is pivoted, as at 48, upon the lever 40 and coacts with a tooth-rack 49, secured upon the box 4. By means of this construction it will be seen that the lever 40 when moved in the proper direction will elevate the clutch member 16 to disengage it from the clutch member 17, and thereby prevent the former member imparting its motion to the latter, and by means of the pawl or dog 47 and the rack-bar 49 said lever 40 may be locked against movement in order to hold said clutch members in their disengaged position. By bifurcating the link or rod 36 and forming the two arms 38, which extend upon opposite sides of the box 4, it will be seen that the lever 40 may be mounted upon either side of the latter, and, if desired, one of these levers may be provided upon each side of said box. In order to permit the person who is wiring a bale of hay in the box or frame 8 to instantly stop the press in case of emergency, I mount upon said box 8 a lever 50, which has its lower end pivotally connected by a link 57 to the lower end of the lever 40, so that by operating the lever 50 the rod 36, and hence the clutch member 16, may be operated, as will be readily understood. In order to permit a person standing on the ground and feeding the hay into the hopper 7 to instantly stop the press when the necessity arises, a lever 52 is pivotally mounted upon the box 4 and connected by a link 53 to the lower end of said lever 40, as shown.

In order to brace the frame 13 and the frame 2, I provide above the plunger 6 a longitudinally-extending brace 55, which is preferably constructed of two parts 56 and 57, the former being in a lower plane than the latter to permit the draft-animals when horse-power is used to operate the press to pass over the same. As shown, said portion 56 has one of its ends secured at 58 to the box 4 and its opposite end adjustably secured, by means of a nut 59, in a vertically-disposed block 60, which is supported by a brace or bracket 61, secured upon the frame 2. The portion 57 has one of its ends 62 secured to the upper portion of the frame 13 and its opposite end adjustably secured in the upper portion of said block 60. In order to strengthen the connection of the two portions 56 and 57, a tension-link 63 is provided. Said link or loop is passed around the block 60 below the portion 56 and has its opposite end engaged with a hook 64, formed upon a clamping device 65, which consists of two plates 66, disposed upon opposite sides of the portion 57 and adjustably held thereon by a series of bolts 67.

The construction, operation, and advantages of my invention will be readily understood from the foregoing description, taken in connection with the accompanying drawings. It will be seen that the same may be readily applied to hay-presses of any well-known or preferred construction and that by the use of it the operation of the press may be instantly stopped at any desired point.

While I have shown and described the preferred embodiment of my invention, it will be understood that various changes in the form, proportion, and the minor details of construction may be resorted to without departing from the principle or sacrificing any of the advantages of this invention.

Having thus described my invention, what I claim as new, and desire to secure by Letters Patent, is—

The combination of a suitable support upon a press or the like, a bearing, an open frame, a spindle revolubly mounted in said bearing and said frame, a cam revolubly mounted upon said spindle and formed with an integral friction clutch member, a press-plunger coacting with said cam and having one of its ends pivotally connected to said spindle, a sweep-head upon said spindle formed with an integral clutch member to coact with the first-mentioned clutch member, a spring for holding said clutch members in engagement with each other, and means for separating said clutch members, substantially as described.

In testimony whereof I have hereunto set my hand in presence of two subscribing witnesses.

CHARLEY E. DAVIS.

Witnesses:
A. E. MARTIN,
THOS. F. T. WHITNEY.